US012583371B2

(12) United States Patent (10) Patent No.: US 12,583,371 B2

Choe et al. (45) Date of Patent: Mar. 24, 2026

(54) SLIDING INTERLOCKING RECLINING SEAT STRUCTURE

(71) Applicants: HYUNDAI MOTOR COMPANY, Seoul (KR); KIA CORPORATION, Seoul (KR); DAEWON PRECISION INDUSTRIAL CO., LTD, Ansan-si (KR)

(72) Inventors: Seung Chan Choe, Hwaseong-si (KR); Hyun Ko, Suwon-si (KR); Sang Do Park, Suwon-si (KR); Hyo Cheol Kang, Suwon-si (KR); Yun Ho Shin, Cheonan-si (KR); Hyo Jin Ahn, Ansan-si (KR)

(73) Assignees: HYUNDAI MOTOR COMPANY, Seoul (KR); KIA CORPORATION, Seoul (KR); DAEWON PRECISION INDUSTRIAL CO., LTD., Ansan-si (KR)

( * ) Notice: Subject to any disclaimer, the term of this patent is extended or adjusted under 35 U.S.C. 154(b) by 262 days.

(21) Appl. No.: 18/207,966

(22) Filed: Jun. 9, 2023

(65) Prior Publication Data

US 2024/0217398 A1 Jul. 4, 2024

(30) Foreign Application Priority Data

Jan. 4, 2023 (KR) ........................ 10-2023-0001070

(51) Int. Cl.
  B60N 2/22 (2006.01)
  B60N 2/12 (2006.01)
  B60N 2/30 (2006.01)
(52) U.S. Cl.
  CPC ............. B60N 2/2245 (2013.01); B60N 2/12 (2013.01); B60N 2/3009 (2013.01); B60N 2/3047 (2013.01)

(58) Field of Classification Search
  CPC ...... B60N 2/2245; B60N 2/12; B60N 2/3009; B60N 2/3047; B60N 2/06
  See application file for complete search history.

(56) References Cited

U.S. PATENT DOCUMENTS

| | | | | |
|---|---|---|---|---|
| 6,312,055 B1 * | 11/2001 | Uematsu | ................ | B60N 2/366 |
| | | | | 297/378.12 |
| 7,931,338 B2 * | 4/2011 | Lindsay | ............... | B60N 2/2245 |
| | | | | 297/378.12 |

(Continued)

FOREIGN PATENT DOCUMENTS

| | | | |
|---|---|---|---|
| KR | 2020-0132418 A | 11/2020 |

*Primary Examiner* — David R Dunn
*Assistant Examiner* — Jessica Kathryn Thompson
(74) *Attorney, Agent, or Firm* — MCDONNELL BOEHNEN HULBERT & BERGHOFF LLP

(57) ABSTRACT

A sliding interlocking reclining seat structure includes a seat cushion assembly configured to move forward and backward within a vehicle body, a rail assembly positioned on a lower end of the seat cushion assembly and configured so that the seat cushion assembly slides, a seatback assembly connected to the seat cushion assembly through a hinge part and configured to move in a height direction of the vehicle body in response to the sliding of the seat cushion assembly, and a latch assembly, disposed on an upper end of the seatback assembly, including a guide bracket having a slot formed therein in a height direction, and configured to be fastened to one end of a striker fixed to the vehicle body. While the seat cushion assembly slides, the latch assembly vertically moves along the slot when fastened to the striker, and the seatback assembly moves in the height direction of the vehicle body as the hinge part moves forward.

10 Claims, 8 Drawing Sheets

(56) References Cited

U.S. PATENT DOCUMENTS

| | | | | |
|---|---|---|---|---|
| 9,573,490 | B1 * | 2/2017 | Poniatowski | ........ B60N 2/3031 |
| 10,065,536 | B2 * | 9/2018 | Poniatowski | ........ B60N 2/2209 |
| 2004/0104590 | A1 * | 6/2004 | Kikuchi | .............. B60N 2/3011 |
| | | | | 296/65.03 |

* cited by examiner

SLIDING INTERLOCKING RECLINING SEAT STRUCTURE

CROSS REFERENCE TO RELATED APPLICATIONS

This application claims under 35 U.S.C. § 119(a) the benefit of priority to Korean Patent Application No. 10-2023-0001070 filed on Jan. 4, 2023, the entire contents of which are incorporated herein by reference.

BACKGROUND

(a) Technical Field

The present disclosure relates to a sliding interlocking reclining seat structure, and more preferably, to a sliding interlocking reclining seat structure in which a seatback assembly may be reclined by interlocking with a sliding motion of a seat cushion assembly through a latch assembly structure positioned on the seatback assembly.

(b) Background Art

In general, a seat of a vehicle is composed of a seatback for supporting a user's back and a seat cushion for supporting a hip portion, and the seatback, which is a backrest portion of the seat, has a structure in which an angle may be adjusted in a front-rear direction through reclining.

Today, in the case of vehicles with limited rear seat space, such as pickup trucks and purpose built vehicles (PBVs), a need for indoor habitability and comfort functions is increasing. In addition, there is a demand for utilizing an internal space of a vehicle and increasing an internal loading space. However, when the angle of the seatback of the rear seat is not adjusted, it is not possible to satisfy the occupants' comfortable seating experience, and thus a reclining function is required. In addition, there is a need for a tip-up function of the seat cushion or a folding function of the seatback, which may variously utilize internal spaces and provide the loading space.

Conventionally, a recliner release structure by an adjusting lever and a recliner release structure using an actuator have been separately configured on a seat frame. In the conventional structure, there is a problem in that a large number of components suitable for each structure are required to constitute and manufacture two adjusting devices at once, thereby increasing the number of components and complicating a configuration of a cushion frame. In addition, in the case of a power specification such as a motor and a gearbox, there is a problem in that their weights are excessive and their material costs are increased.

SUMMARY

The present disclosure has been made in efforts to solve the above problems and is directed to providing a sliding interlocking reclining seat structure having an adjustable height of a seatback that interlocks with a seat cushion in a state of being fixed to a vehicle body through a latch assembly.

In addition, the present disclosure is directed to providing a sliding interlocking reclining seat structure in which a seatback may be folded by releasing a latch assembly and a striker, and a seat cushion may be tipped up by operating a tip-up lever.

The objects of the present disclosure are not limited to the above-described objects, and other objects of the present disclosure that are not mentioned can be understood by the following description and can be more clearly understood by embodiments of the present disclosure. In addition, the objects of the present disclosure may be realized by the means and combinations described in the claims.

A sliding interlocking reclining seat structure for achieving the objects of the present disclosure includes the following configuration.

In one embodiment of the present disclosure, a sliding interlocking reclining seat structure includes a seat cushion assembly configured to move forward and backward within a vehicle body, a rail assembly positioned on a lower end of the seat cushion assembly and configured so that the seat cushion assembly slides, a seatback assembly connected to the seat cushion assembly through a hinge part and configured to move in a height direction of the seatback assembly in response to the sliding of the seat cushion assembly, and a latch assembly, disposed on an upper end of the seatback assembly, including a guide bracket having a slot formed therein in a height direction, and configured to be fastened to one end of a striker fixed to the vehicle body, wherein while the seat cushion assembly slides, the latch assembly vertically moves along the slot in a state of being fastened to the striker, and the seatback assembly is configured to move in the height direction as the hinge part moves forward.

In addition, the latch assembly may include a guide rod extending in the height (vertical) direction of the guide bracket and fastened to an inside of the guide bracket, a latch unit positioned inside the guide bracket adjacent to the guide rod and configured to move in the height direction in a state of being inserted into the slot and to be fastened to the one end of the striker, a latch bracket fastened to the latch unit and configured to move in the height direction along the guide rod, and a compression spring configured to have one end fastened to the latch bracket and the other end fixed to the guide bracket to surround the guide rod.

In addition, the seat cushion assembly may include a set bracket having the hinge part formed on an upper end thereof, a seat cushion member configured to have one end fastened to the hinge part and the rotatable other end, and a sliding lever positioned on the seat cushion member and connected to the set bracket by a cushion cable.

In addition, the rail assembly may include an upper rail fixed to the set bracket and a lower rail positioned on a lower end of the upper rail and fixed to a vehicle body floor.

In addition, when the sliding lever is pulled, tension may be applied to the cushion cable to release the upper rail and the lower rail, and the seat cushion member may be configured to move forward integrally with the hinge part.

In addition, a lower end of the seatback assembly fastened to the hinge part may be configured to slide integrally with the seat cushion member, and an upper end of the seatback assembly may be configured to move down in the height direction.

In addition, the latch bracket may be in contact with an upper end of the slot to compress the compression spring, and the latch unit may be rotated downward to surround the striker.

In addition, the sliding interlocking reclining seat structure may further include a folding lever formed on the seatback assembly and configured to be connected to the latch unit by a folding cable.

In addition, when a user operates the folding lever, the latch unit that receives tension through the folding cable may be rotated and released from the striker, and the seatback assembly may be configured to have an upper end rotated with respect to the hinge part and folded.

In addition, the sliding interlocking reclining seat structure may further include a restoring spring formed on the hinge part, a locking rod positioned adjacent to the hinge part and configured to be fastened to the set bracket and the seat cushion member to limit the rotation of the seat cushion member, and a tip-up lever formed on the seat cushion member and connected to the locking rod by a tip-up cable.

In addition, when the tip-up lever is operated, the locking rod that receives tension from the tip-up cable may be released from the seat cushion member, and the front end of the seat cushion member may be configured to be rotated with respect to the hinge part.

The present disclosure can obtain the following effects by the above-described embodiments and the configuration, coupling, and use relationship, which will be described below.

According to the present disclosure, the sliding interlocking reclining seat structure can be configured to have the adjustable height of the seatback that interlocks with the seat cushion in the state of being fixed to the vehicle body through the latch assembly, thereby implementing the comfortable seating posture for the rear seat occupants.

In addition, the sliding interlocking reclining seat structure can be configured so that the seatback can be folded by releasing the latch assembly and the striker and the seat cushion can be tipped up by operating the tip-up lever, thereby increasing the utilization of the internal space of the vehicle and providing the storage space.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
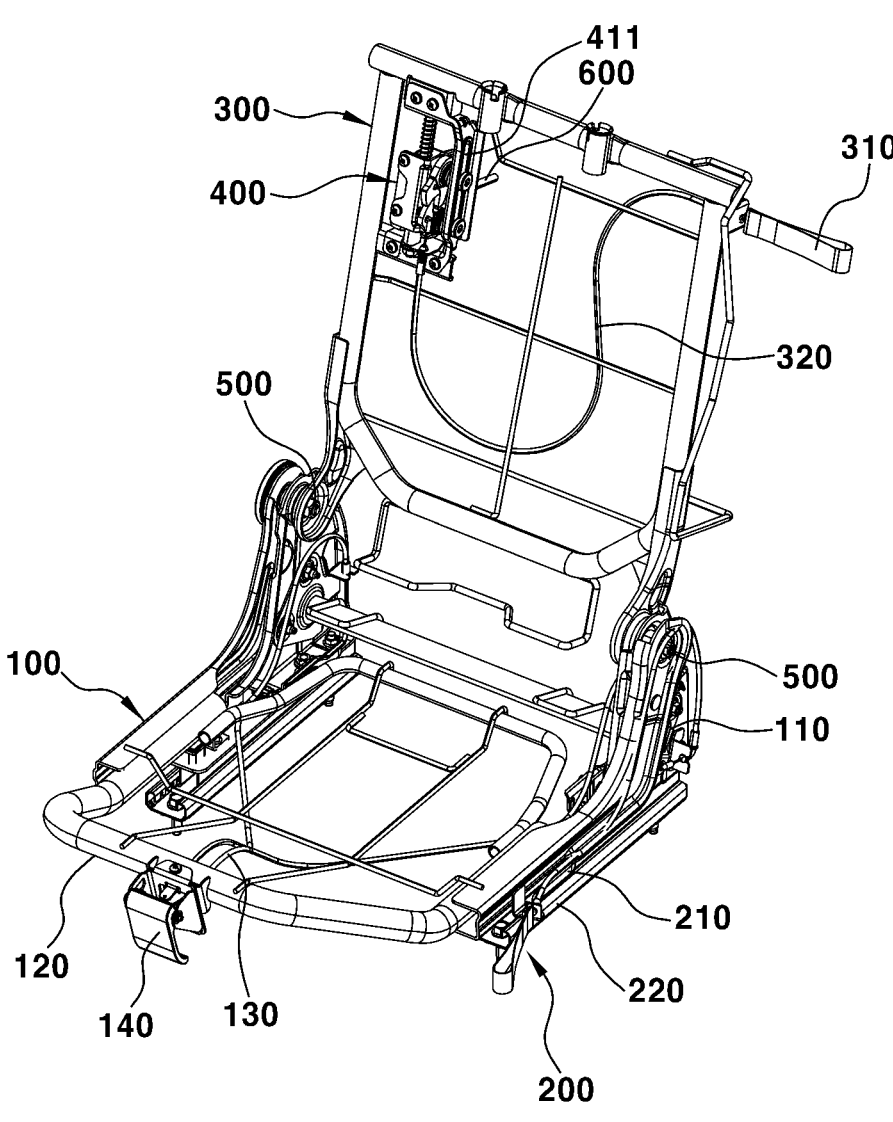
FIG. 1 shows a perspective view of a sliding interlocking reclining seat structure as one embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure will be described in more detail with reference to the accompanying drawings. The embodiments of the present disclosure may be modified in various forms, and the scope of the present disclosure should not be construed as being limited to the following embodiments. The embodiments are provided to more completely describe the present disclosure to those skilled in the art.

In addition, terms such as " . . . assembly," " . . . unit," and " . . . part" described in the specification mean a unit that processes at least one function or operation, which may be implemented by hardware or a combination of hardware.

In addition, "upper end" described in the specification means a direction moving up in a height direction on the drawing, and "lower end" means a direction moving down in the height direction on the drawing.

In addition, when a certain portion is described to be "on" or "above" another portion in the specification, it includes not only a case where the certain portion is positioned "directly on" another portion but also a case in which other portions are present therebetween. In addition, when a certain portion is described to be "under" or "below" another portion, it includes not only a case where the certain portion is positioned "directly under" another portion but also a case in which other portions are present therebetween.

Figure 2:
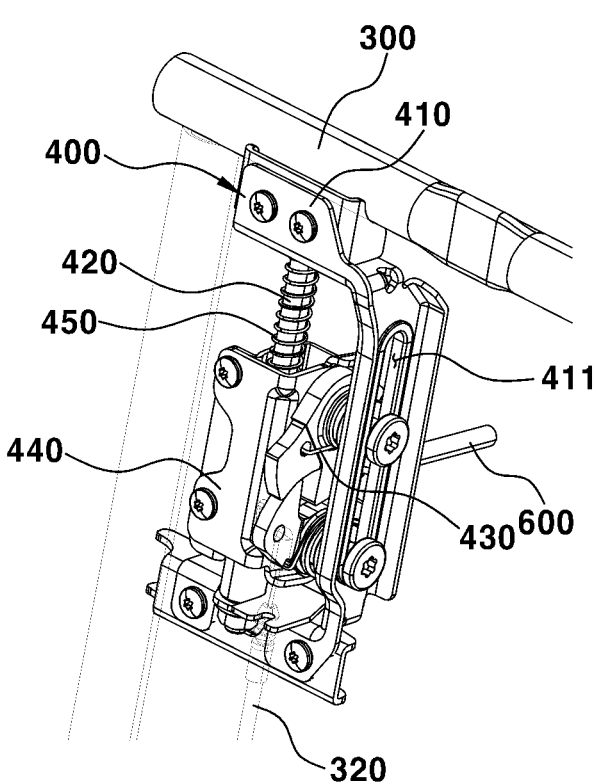
FIG. 2 shows a latch assembly of the sliding interlocking reclining seat structure as one embodiment of the present disclosure.

FIG. 1 shows a perspective view of a sliding interlocking reclining seat structure as one embodiment of the present disclosure, and FIG. 2 shows a latch assembly of the sliding interlocking reclining seat structure as one embodiment of the present disclosure.

Referring to FIGS. 1 and 2, the sliding interlocking reclining seat structure according to one embodiment of the present disclosure includes a seat cushion assembly 100, a rail assembly 200, a seatback assembly 300, and a latch assembly 400.

The seat cushion assembly 100 is configured to move forward and backward within a vehicle body. More specifically, the seat cushion assembly 100 is positioned on an upper end of the rail assembly 200 and moves forward or backward in the forward and backward direction along the rail assembly 200. The seat cushion assembly 100 includes a set bracket 110, a seat cushion member 120, and a sliding lever 140.

The set bracket 110 has a hinge part 500 formed on an upper end thereof. More specifically, the set bracket 110 has the hinge part 500 configured to connect the seat cushion assembly 100 and the seatback assembly 300 formed on the upper end thereof and has a lower end fastened to the rail assembly 200.

The seat cushion member 120 is configured to have one end fastened to the hinge part 500 and the rotatable other end. The seat cushion member 120 may be configured to be surrounded by a seat cushion of a vehicle. The sliding lever 140 is positioned on the seat cushion member 120. In one embodiment, the sliding lever 140 may be positioned in a central region of a front end of the seat cushion member 120 and configured to be exposed to the outside of the seat cushion. The sliding lever 140 is connected to the set bracket 110 by a cushion cable 130.

The rail assembly 200 is positioned on a lower end of the seat cushion assembly 100 and configured so that the seat cushion assembly 100 slides. The rail assembly 200 includes an upper rail 210 and a lower rail 220. The upper rail 210 is fixed to the set bracket 110. In one embodiment, the upper rail 210 may be fixed to a lower end of the set bracket 110 with bolts. The lower rail 220 is positioned on a lower end of the upper rail 210 and fixed to a vehicle body floor. The lower rail 220 is fixed to the vehicle body floor and configured so that the upper rail 210 slides.

The seatback assembly 300 is connected to the seat cushion assembly 100 through the hinge part 500. The hinge part 500 is positioned on a lower end of the seatback assembly 300. The seatback assembly 300 is configured to move in a height direction in response to the sliding of the seat cushion assembly 100. More specifically, the seatback assembly 300 is configured to have the lower end sliding integrally with the seat cushion member 120 and the upper end moving down in the height direction.

The latch assembly 400 includes a guide bracket 410. The guide bracket 410 includes a slot 411 positioned on the upper end of the seatback assembly 300 and formed in the height direction. The latch assembly 400 is configured to be fastened to one end of a striker 600 fixed to the vehicle body. The latch assembly 400 includes a guide rod 420, a latch unit 430, a latch bracket 440, and a compression spring 450.

The guide rod 420 extends in the height direction of the guide bracket 410 and is fastened to an inside of the guide bracket 410. In one embodiment, the guide rod 420 may be positioned on an inner center of the guide bracket 410 and may have both ends bolt-fixed to the guide bracket 410. The latch unit 430 is positioned inside the guide bracket 410 adjacent to the guide rod 420. More specifically, the latch unit 430 is positioned between the guide rod 420 and the slot 411 of the guide bracket 410. The latch unit 430 is configured to move in the height direction in a state of being inserted into the slot 411 and to be fastened to one end of the striker 600.

The latch bracket 440 is fastened to the latch unit 430 and configured to move in the height direction along the guide rod 420. In one embodiment, the latch unit 430 may be fixed to the latch bracket 440 by a bolt passing through the slot 411. The bolt may pass through the slot 411 to be fastened to the latch unit 430 and guide the latch unit 430 to move along the slot 411. The compression spring 450 has one end fastened to the latch bracket 440 and the other end fixed to the guide bracket 410. The compression spring 450 is configured to surround the guide rod 420. The compression spring 450 may be compressed and stretched along the guide rod 420.

The latch unit 430 maintains the state of being fastened to the striker 600 while the seat cushion assembly 100 slides. When the seat cushion assembly 100 slides, the hinge part 500 moves forward, and the seatback assembly 300 moves down in the height direction. At this time, the latch unit 430 faces upward along the slot 411, and the latch unit 430 is additionally rotated so that the latch unit 430 and the striker 600 maintain the fastened state.

Figure 3:
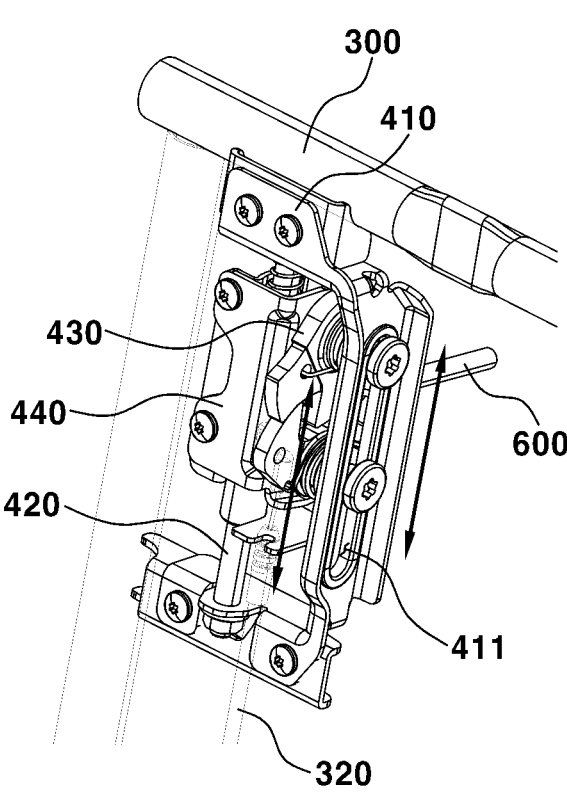
FIG. 3 shows a case in which an upper end of a seatback assembly moves down and a latch bracket is in contact with an upper end of a slot as one embodiment of the present disclosure.
Figure 4:
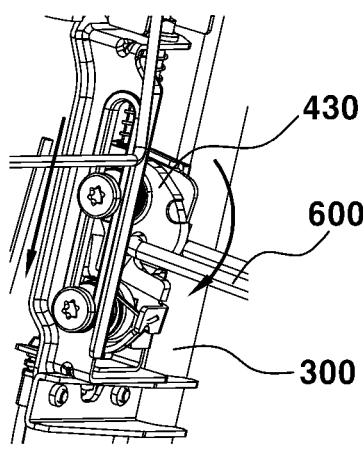
FIG. 4 shows that a latch unit rotates downward to surround a striker when the upper end of the seatback assembly moves down as one embodiment of the present disclosure.
Figure 5:
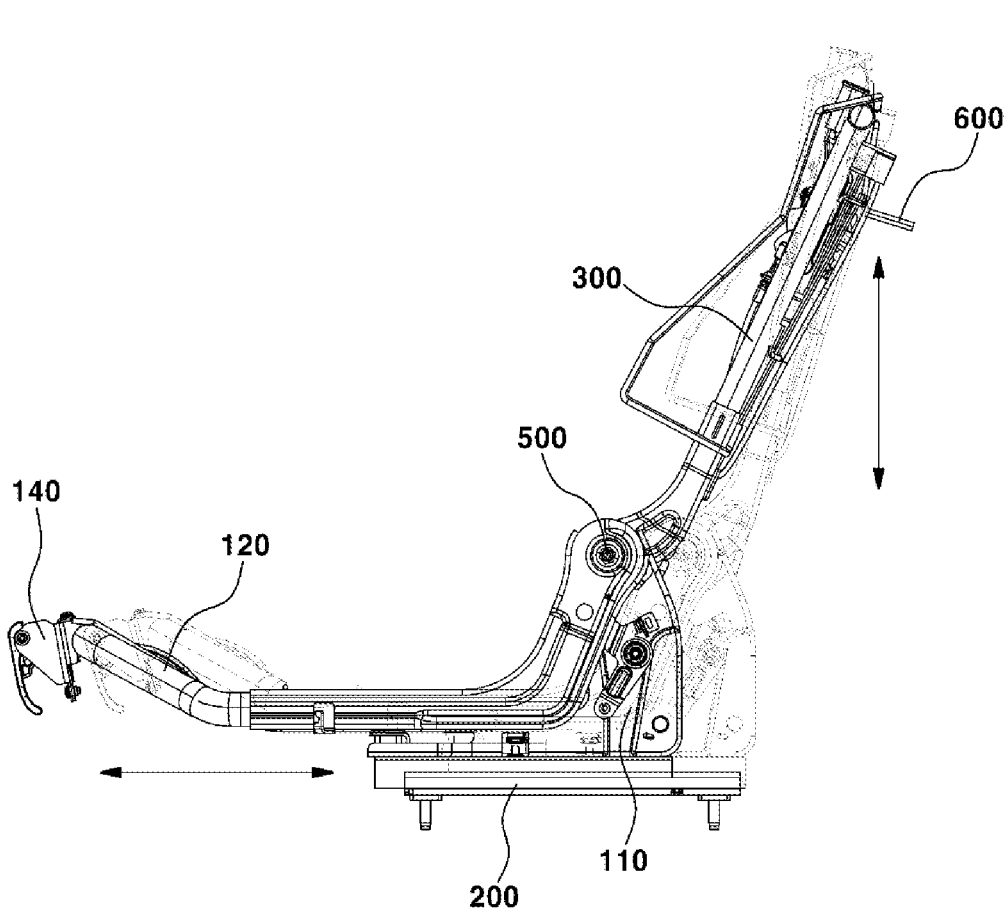
FIG. 5 shows an interlocking driving relationship between the sliding of a seat cushion assembly having the sliding interlocking reclining seat structure and the seatback assembly as one embodiment of the present disclosure.

FIG. 3 shows a case in which the upper end of the seatback assembly 300 moves down and the latch bracket 440 is in contact with the upper end of the slot 411 as one embodiment of the present disclosure, FIG. 4 shows that the latch unit 430 rotates downward to surround a striker 600 when the upper end of the seatback assembly 300 moves down as one embodiment of the present disclosure, and FIG. 5 shows an interlocking driving relationship between the sliding of the seat cushion assembly 100 having the sliding interlocking reclining seat structure and the seatback assembly 300 as one embodiment of the present disclosure. The seat cushion member 120 and the seatback assembly 300 are connected to be mutually rotated with respect to the hinge part 500.

Referring to FIGS. 3 to 5, when the sliding lever 140 is pulled, tension is applied to the cushion cable 130 to release the upper rail 210 and the lower rail 220. When the upper rail 210 and the lower rail 220 are released, the seat cushion member 120 is configured to move forward integrally with the hinge part 500. At this time, the lower end of the seatback assembly 300 fastened to the hinge part 500 slides integrally with the seat cushion member 120. At the same time, the upper end of the seatback assembly 300 is configured to move down in the height direction. When the seat cushion member 120 slides forward, an angle formed between the seat cushion member 120 and the seatback assembly 300 with respect to the hinge part increases. Therefore, the latch bracket 440 is in contact with the upper end of the slot 411, and the compression spring 450 is compressed. At this time, the latch unit 430 is rotated downward to surround the striker 600.

While the upper end of the seatback assembly 300 moves down in the height direction, the latch unit 430 maintains the state of being fastened to the striker 600. More preferably, the guide bracket 410 moves down integrally with the movement of the upper end of the seatback assembly 300, and the latch bracket 440 moves relatively with respect to the guide bracket 410 to be positioned on an upper end of the guide rod 420 along the guide rod 420. The latch bracket 440 compresses the compression spring 450 when positioned on the upper end of the guide rod 420, and the compression spring 450 is configured to provide a restoring force to the latch bracket 440.

Figure 6:
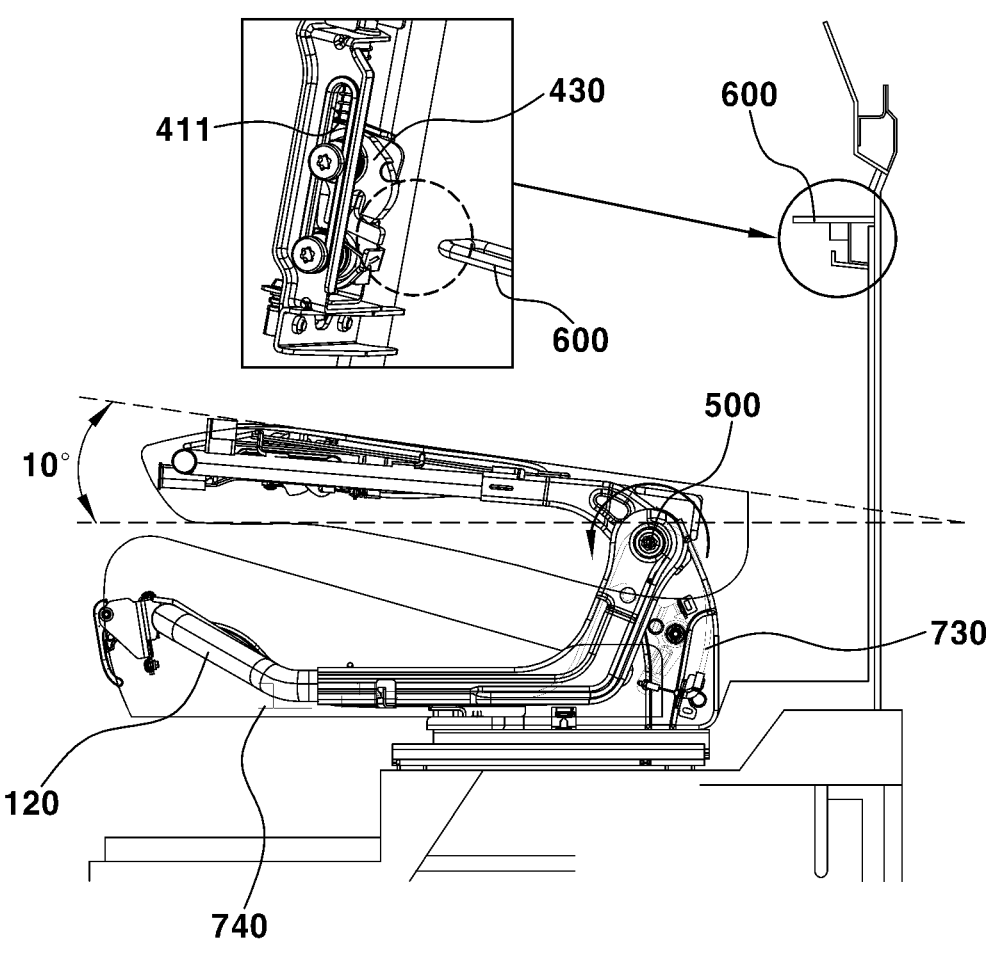
FIG. 6 shows a folding driving of the seatback assembly having the sliding interlocking reclining seat structure as one embodiment of the present disclosure.

FIG. 6 shows a folding driving of the seatback assembly 300 having the sliding interlocking reclining seat structure as one embodiment of the present disclosure.

Referring to FIG. 6, the seatback assembly 300 is configured to be folded with respect to the hinge part 500. The sliding interlocking reclining seat structure according to the present disclosure is configured to further include a folding lever 310. The folding lever 310 is formed on the seatback assembly 300 and configured to be connected to the latch unit 430 by a folding cable 320.

In one embodiment, the folding lever 310 may be positioned on the upper end of the seatback assembly 300. More specifically, the latch unit 430 may be coupled to a bracket of the folding cable 320 to which the folding cable 320 is fastened. When a user operates the folding lever 310, the latch unit 430 that receives tension through the folding cable 320 is rotated and released from the striker 600.

When the latch unit 430 and the striker 600 are released, the seatback assembly 300 is configured to be folded with respect to the hinge part 500. More specifically, the upper end of the seatback assembly 300 is rotated forward with respect to the hinge part 500 and folded to be close to the seat cushion. In one embodiment, the upper end of the seatback assembly 300 may be rotated forward by 100° with respect to the hinge part 500 and folded.

After the seatback assembly 300 is folded, when the user unfolds the seatback assembly 300 again, the latch unit 430 and the striker 600 are re-fastened.

Figure 7:
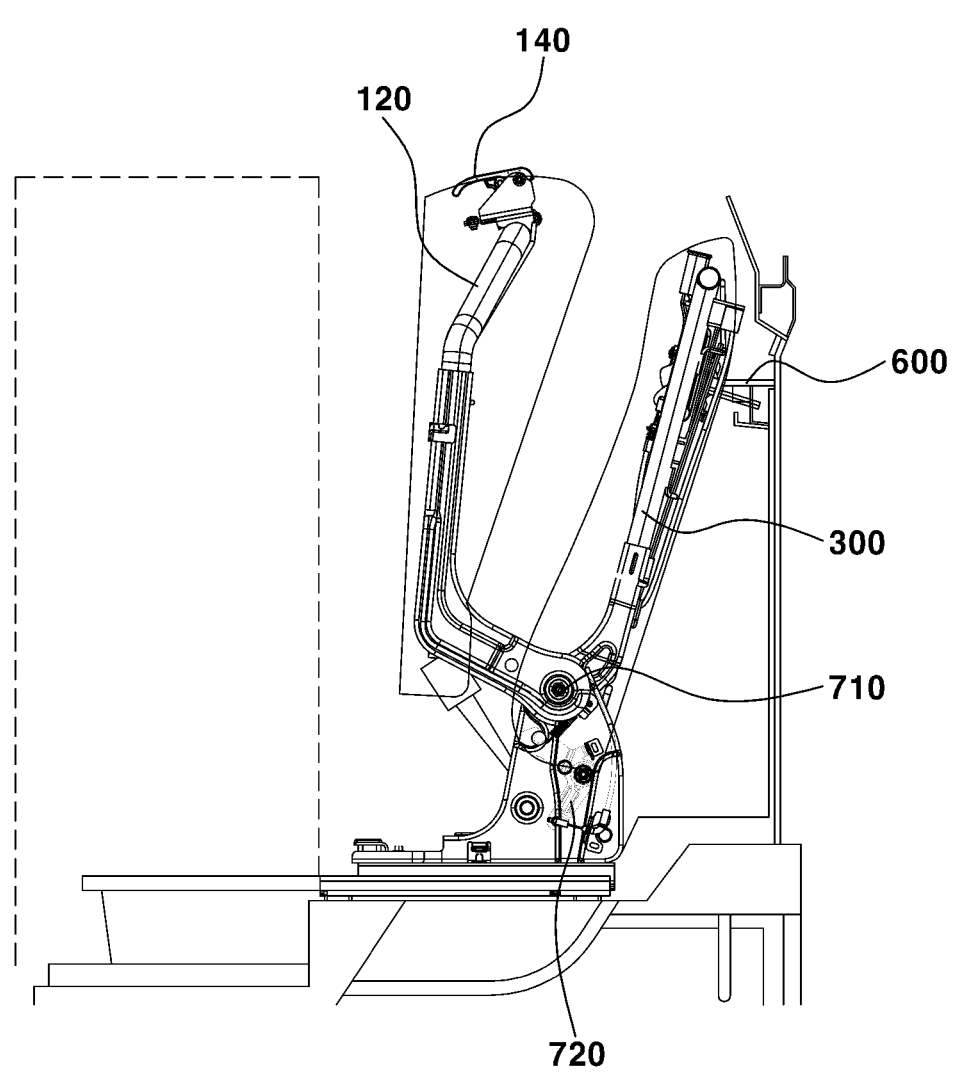
FIG. 7 shows the tip-up driving of a seat cushion member having the sliding interlocking reclining seat structure as one embodiment of the present disclosure.
Figure 8:
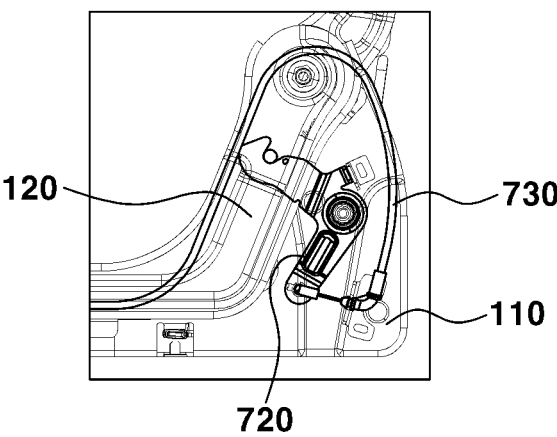
FIG. 8 shows a locking rod for the tip-up driving of the seat cushion member having the sliding interlocking reclining seat structure as one embodiment of the present disclosure.

FIG. 7 shows the tip-up driving of the seat cushion member 120 having the sliding interlocking reclining seat structure as one embodiment of the present disclosure, and FIG. 8 shows a locking rod for the tip-up driving of the seat cushion member having the sliding interlocking reclining seat structure as one embodiment of the present disclosure.

Referring to FIGS. 7 and 8, the sliding interlocking reclining seat structure according to one embodiment of the present disclosure further includes a tip-up lever 740, a locking rod 720, and a restoring spring 710 for the tip-up driving of the seat cushion.

The restoring spring 710 is formed on the hinge part 500. In one embodiment, the restoring spring 710 may be fastened to an outer surface of the hinge part 500. The locking rod 720 is positioned adjacent to the hinge part 500 and fastened to the set bracket 110 and the seat cushion member 120. The locking rod 720 is configured so that the seat cushion member 120 is fixed to the set bracket 110. In one embodiment, one end of the locking rod 720 may be caught on the seat cushion member 120 and fixed so that the seat cushion member 120 is not tipped up. In one embodiment, the locking rod 720 may be configured in a shape in which a central portion 720a is bent and fastened to the set bracket 110.

The tip-up lever 740 is formed on the seat cushion member 120. In one embodiment, the tip-up lever 740 may be positioned on an outer surface of the seat cushion member 120. The tip-up lever 740 is connected to the locking rod 720 by a tip-up cable 730. In one embodiment, the other end of the locking rod 720 may be positioned on the set bracket 110 and connected to the tip-up cable 730.

When the tip-up lever 740 is operated, one end of the locking rod 720 is released from a striker 10 of the seat cushion member 120 as the locking rod 720 that receives tension from the tip-up cable 730 rotates counterclockwise, and thus the front end of the seat cushion member 120 is configured to be rotated with respect to the hinge part 500.

In one embodiment, when the tip-up lever 740 is operated, the other end of the locking rod 720 may be rotated with respect to the central portion 720a fastened to the set bracket 110 and released from the set bracket 110 and at the same time, one end of the locking rod 720 may also be rotated counterclockwise by the rotation of the other end and released from the striker 10 of the seat cushion member 120.

When the seat cushion member 120 is released from the locking rod 720, the front end of the locking rod 720 is rotated upward with respect to the hinge part 500. In one embodiment, the front end of the seat cushion member 120 may be tipped up by rotating 93° with respect to the hinge part 500. When the seat cushion member 120 is tipped up, a space positioned on the lower end of the seat cushion assembly 100 may be used as a storage space.

In summary, the present disclosure provides the sliding interlocking reclining seat structure configured so that the seatback assembly 300 may be reclined by interlocking with the sliding operation of the seat cushion assembly 100 through the structure of the latch assembly 400 positioned on the seatback assembly 300, and in addition, the seatback assembly 300 may be folded or the seat cushion may be tipped up.

The above detailed description is illustrative of the present disclosure. In addition, the above contents are intended to show and describe the preferred embodiments of the present disclosure, and the present disclosure can be used in various other combinations, changes, and environments. In other words, changes or modifications are possible within the scope of the concept of the disclosure disclosed in the specification, the scope equivalent to the disclosed contents, and/or the scope of technology or knowledge in the art. The described embodiments describe the best mode for implementing the technical spirit of the present disclosure, and various changes required in specific applications and uses of the present disclosure are also possible. Therefore, the above detailed description of the disclosure is not intended to limit the present disclosure to the disclosed embodiments. In addition, the appended claims should be construed to also include other embodiments.

The invention claimed is:

1. A sliding interlocking reclining seat structure comprising:

a seat cushion assembly configured to move forward and backward within a vehicle body;

a rail assembly positioned on a lower end of the seat cushion assembly, wherein the seat cushion assembly is configured to slide along the rail assembly;

a seatback assembly connected to the seat cushion assembly by a hinge part, the seatback assembly being configured to move in a height direction of the vehicle body in response to the sliding of the seat cushion assembly; and a latch assembly, positioned on an upper end of the seatback assembly, wherein the latch assembly including a guide bracket having a slot formed in a height direction of the guide bracket, and configured to be fastened to one end of a striker fixed to the vehicle body;

wherein when the seat cushion assembly slides along the rail assembly, the latch assembly moves along the slot when fastened to the striker, and the seatback assembly is configured to move in the height direction of the vehicle body as the hinge part moves forward;

wherein the latch assembly includes:

a guide rod extending in the height direction of the guide bracket and fastened to an inside of the guide bracket;

a latch unit positioned inside the guide bracket adjacent to the guide rod, and configured to move in the height direction of the slot when inserted into the slot, and further configured to be fastened to the one end of the striker;

a latch bracket fastened to the latch unit and configured to move in the height direction of the guide rod; and a compression spring configured to have one end fastened to the latch bracket and another end fixed to the guide bracket to surround the guide rod.

2. The sliding interlocking reclining seat structure of claim 1, wherein the seat cushion assembly includes:

a set bracket having the hinge part formed on an upper end;

a seat cushion member configured to have one end fastened to the hinge part and an other end configured to rotate; and a sliding lever positioned on the seat cushion member and connected to the set bracket by a cushion cable.

3. The sliding interlocking reclining seat structure of claim 2, wherein the rail assembly includes:

an upper rail fixed to the set bracket; and a lower rail positioned on a lower end of the upper rail and fixed to a vehicle body floor.

4. The sliding interlocking reclining seat structure of claim 3, wherein when the sliding lever is pulled, tension is applied to the cushion cable to release the upper rail and the lower rail, and the seat cushion member is configured to move forward integrally with the hinge part.

5. The sliding interlocking reclining seat structure of claim 4, wherein a lower end of the seatback assembly fastened to the hinge part is configured to slide integrally with the seat cushion member, and an upper end of the seatback assembly is configured to move downward.

6. The sliding interlocking reclining seat structure of claim 5, wherein the latch bracket is in contact with an upper end of the slot to compress the compression spring, and the latch unit is rotated downward to surround the striker.

7. The sliding interlocking reclining seat structure of claim 1, further comprising a folding lever formed on the seatback assembly and configured to be connected to the latch unit by a folding cable.

8. The sliding interlocking reclining seat structure of claim 7, wherein when a user operates the folding lever, the latch unit that receives tension through the folding cable is rotated and released from the striker, and the seatback assembly is configured to be folded with respect to the hinge part.

9. The sliding interlocking reclining seat structure of claim 2, further comprising: a restoring spring formed on the hinge part;

a locking rod positioned adjacent to the hinge part and configured to be fastened to the set bracket and the seat cushion member to limit the rotation of the seat cushion member; and a tip-up lever formed on the seat cushion member and connected to the locking rod by a tip-up cable.

10. The sliding interlocking reclining seat structure of claim 9, wherein when the tip-up lever is operated, the locking rod that receives tension from the tip-up cable is released from the seat cushion member, and the front end of the seat cushion member is configured to be rotated with respect to the hinge part.

\* \* \* \* \*